United States Patent
Song

(10) Patent No.: US 9,817,498 B2
(45) Date of Patent: Nov. 14, 2017

(54) DISPLAY DEVICE AND CONTROL METHOD THEREOF

(71) Applicant: LG ELECTRONICS INC., Seoul (KR)

(72) Inventor: Jiyoung Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/896,649

(22) PCT Filed: Dec. 20, 2013

(86) PCT No.: PCT/KR2013/011919
§ 371 (c)(1),
(2) Date: Dec. 7, 2015

(87) PCT Pub. No.: WO2015/002362
PCT Pub. Date: Jan. 8, 2015

(65) Prior Publication Data
US 2016/0154493 A1    Jun. 2, 2016

(30) Foreign Application Priority Data
Jul. 1, 2013 (KR) .................... 10-2013-0076576

(51) Int. Cl.
*G06F 3/041* (2006.01)
*G06F 3/0487* (2013.01)
(Continued)

(52) U.S. Cl.
CPC .............. *G06F 3/041* (2013.01); *G06F 3/011* (2013.01); *G06F 3/013* (2013.01); *G06F 3/0482* (2013.01);
(Continued)

(58) Field of Classification Search
None
See application file for complete search history.

(56) References Cited

U.S. PATENT DOCUMENTS

| 8,223,024 B1 | 7/2012 | Petrou |
| 2007/0164985 A1 | 7/2007 | Jeong et al. |

(Continued)

FOREIGN PATENT DOCUMENTS

| WO | 2008/026878 | 3/2008 |
| WO | 2009126264 | 10/2009 |

OTHER PUBLICATIONS

PCT International Application No. PCT/KR2013/011919, Written Opinion of the International Searching Authority dated May 30, 2014, 1 page.

(Continued)

*Primary Examiner* — Kenneth B Lee, Jr.
(74) *Attorney, Agent, or Firm* — Lee, Hong, Degerman, Kang & Waimey

(57) ABSTRACT

Disclosed are a display device and a method for controlling the same. The display device includes: a body formed to be mountable to a wearer's head, and having a touch sensor for sensing a touch input; a display unit coupled to the body at positions corresponding to two eyes, and configured to output visual information; and a controller configured to determine and execute a control command corresponding to the touch input, based on bio information including a wearer's bio-signal.

15 Claims, 13 Drawing Sheets

(51) Int. Cl.
*G06F 3/0488* (2013.01)
*G06F 3/01* (2006.01)
*G06F 3/0482* (2013.01)
*G06F 3/0485* (2013.01)
*G09G 3/20* (2006.01)

(52) U.S. Cl.
CPC .......... *G06F 3/0485* (2013.01); *G06F 3/0487* (2013.01); *G06F 3/0488* (2013.01); *G09G 3/20* (2013.01); *G09G 2354/00* (2013.01)

(56) References Cited

U.S. PATENT DOCUMENTS

| | | | |
|---|---|---|---|
| 2011/0231757 A1* | 9/2011 | Haddick | G02B 27/017 715/702 |
| 2012/0235896 A1 | 9/2012 | Jacobsen et al. | |
| 2013/0002724 A1 | 1/2013 | Heinrich et al. | |
| 2013/0044042 A1 | 2/2013 | Olsson et al. | |
| 2014/0118243 A1* | 5/2014 | Kim | G02B 27/017 345/156 |
| 2016/0299641 A1* | 10/2016 | Lebeau | G06F 3/0482 |

OTHER PUBLICATIONS

European Patent Office Application Serial No. 13888652.8, Search Report dated Dec. 12, 2016, 9 pages.

* cited by examiner

FIG. 6A
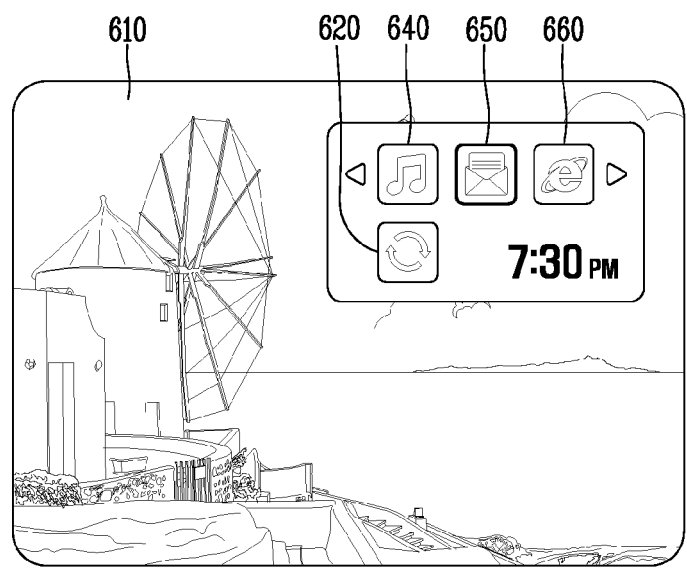
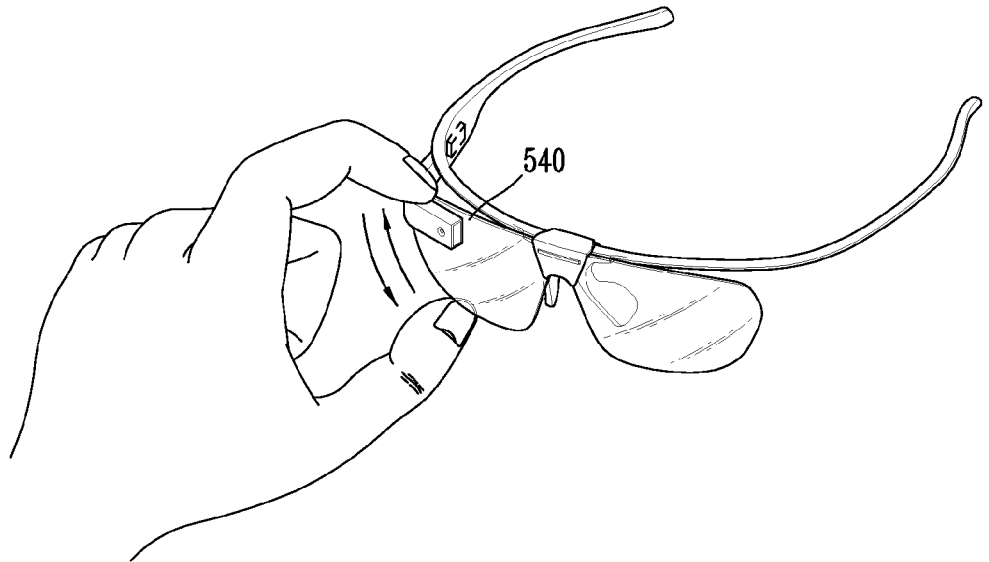

DISPLAY DEVICE AND CONTROL METHOD THEREOF

CROSS-REFERENCE TO RELATED APPLICATIONS

This application is the National Stage filing under 35 U.S.C. 371 of International Application No. PCT/KR2013/011919, filed on Dec. 20, 2013 which claims the benefit earlier filing date and right of priority to Korean Patent Application No. 10-2013-0076576, filed on Jul. 1, 2013, the contents of which are all hereby incorporated by reference herein in their entirety.

TECHNICAL FIELD

The present invention relates to a display device, and more particularly, to a display device mountable to a wearer's head, and a control method thereof.

BACKGROUND ART

As the information society develops rapidly, the importance of a display device capable of implementing a screen with a sense of reality is being emphasized. For instance, a head-mounted display (HMD) device is being researched.

The HMD device is mainly implemented as safety goggles or a helmet. Once a user wears the HMD device, the user can see a screen in front of his or her eyes. The HMD device has been developed for realization of a sense of virtual reality. A small display such as a liquid crystal display is installed at the HMD device close to a wearer's two eyes, so that images can be projected to the display. Recently, the HMD device is being widely developed for use in a space development center, a reactor building, a military agency and a medical institution, for business use or games, etc.

Thanks to such improvements, smart glasses, one example of the HMD device, are presented on the market. The smart glasses realized as a wearable device conveniently execute functions that are executed in the existing mobile terminal.

However, the smart glasses may have the following problems.

Firstly, the smart glasses have very limited input means unlike other terminals such as a smart phone and a notebook computer. Further, voice input through an input means may not be well-recognized due to external noise. Besides, a wearer's privacy cannot be protected, because a third party may hear the wearer's input voice.

DISCLOSURE OF INVENTION

Solution to Problem

Therefore, an object of the present invention is to provide a display device capable of enhancing a user's convenience by executing control commands according to various touch inputs, and a control method thereof.

To achieve these and other advantages and in accordance with the purpose of the present invention, as embodied and broadly described herein, there is provided a display device, comprising: a body formed to be mountable to a wearer's head, and having a touch sensor for sensing a touch input; a display unit coupled to the body at positions corresponding to two eyes, and configured to output visual information; and a controller configured to determined and execute a control command corresponding to the touch input, based on bio information including a wearer's bio-signal.

In an embodiment, in a case where the touch input is applied to the display device, the controller may determine and execute a control command corresponding to the touch input, based on visual information output to the display unit.

In an embodiment, the controller may determine and execute a control command corresponding to a plurality of consecutive touch inputs.

In an embodiment, the controller may release a sleep mode using a control command corresponding to the touch input.

In an embodiment, the controller may record an external image output to the display unit using a control command corresponding to the touch input.

To achieve these and other advantages and in accordance with the purpose of the present invention, as embodied and broadly described herein, there is also provided a method for controlling a display device, the method comprising: (a) sensing a touch input using a touch sensor of a body formed to be mountable to a wearer's head; and (b) determining and executing a control command corresponding to the touch input, based on bio information including a wearer's bio-signal, wherein the body is coupled to a display unit disposed to correspond to two eyes.

In an embodiment, the step (b) may include determining and executing a control command corresponding to the touch input, based on visual information output to the display unit.

In an embodiment, the step (b) may include determining and executing a control command corresponding to a plurality of consecutive touch inputs.

In an embodiment, the step (b) may include releasing a sleep mode using a control command corresponding to the touch input.

In an embodiment, the step (b) may include recording an external image output to the display unit using a control command corresponding to the touch input.

BRIEF DESCRIPTION OF DRAWINGS

FIG. 1 is a block diagram of a display device according to an embodiment of the present invention;

FIGS. 2A and 2B are conceptual views illustrating a communication system where a display device according to the present invention is operable;

FIG. 3 is a conceptual view illustrating a display device according to an embodiment of the present invention;

FIG. 4 is a flowchart for explaining a display device according to an embodiment of the present invention;

FIGS. 5A to 5D are conceptual views illustrating embodiments of touch inputs;

FIGS. 6A to 6C, 7, 8 and 9 are conceptual views illustrating an embodiment where a control command is executed by a wearer's intentional touch input; and FIGS. 10 and 11 are conceptual views illustrating an embodiment where a control command is executed by a wearer's unintentional touch input.

BEST MODE FOR CARRYING OUT THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Figure 1:
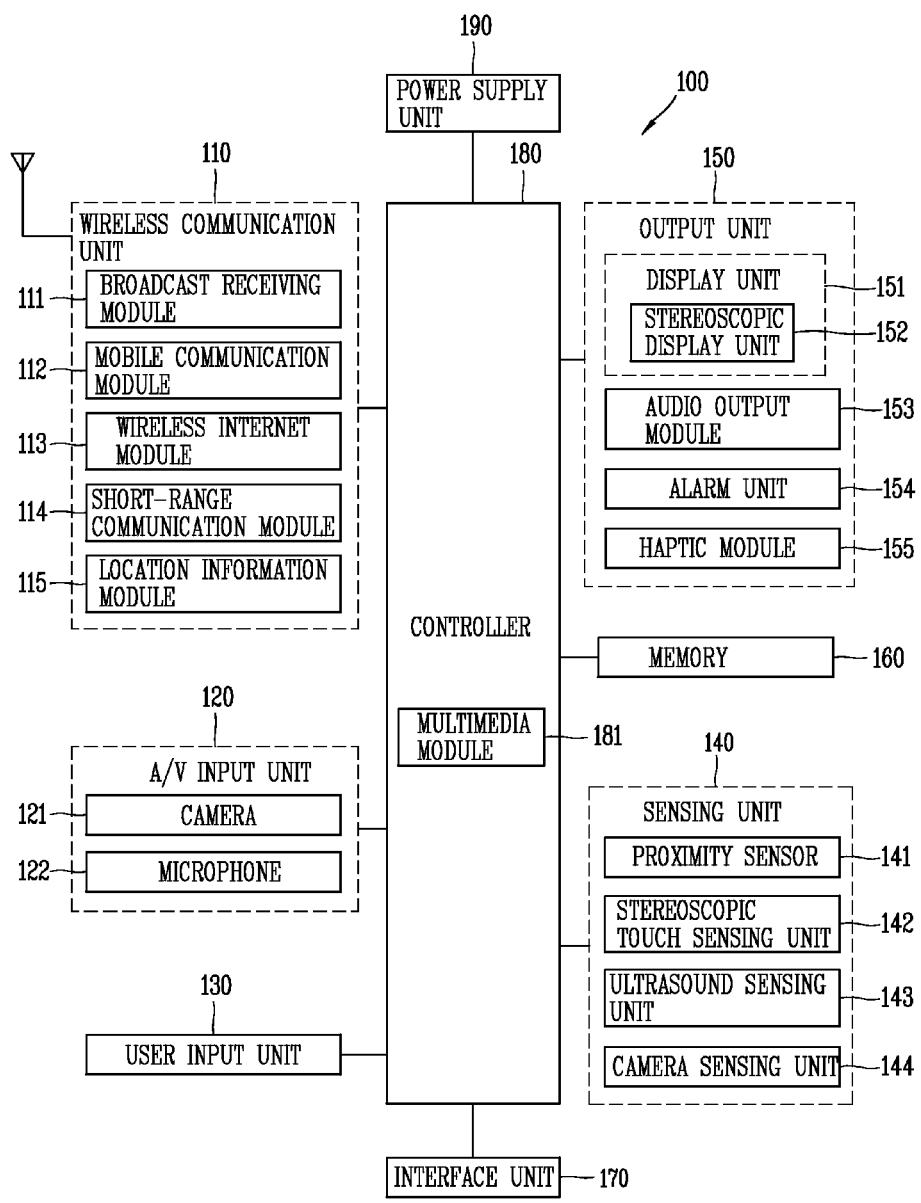

FIG. 1 is a block diagram of a display device 100 in accordance with one exemplary embodiment.

The display device 100 may comprise components, such as a wireless communication unit 110, an Audio/Video (AN) input unit 120, a user input unit 130, a sensing unit 140, an output unit 150, a memory 160, an interface unit 170, a controller 180, a power supply 190 and the like. FIG. 1 shows the display device 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the display device 100 and a wireless communication system or between the display device 100 and a network within which the display device 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the display device 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect a location of the display device 100, a presence or absence of user contact with the display device 100, the location of the display device 100, acceleration/deceleration of the display device 100, and the like, so as to generate a sensing signal for controlling the operation of the display device 100. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the display device 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the display device 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the display device 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as contact touch. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as stereoscopic touch screen), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasound sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasound sensing unit 143 is configured to recognize position information of the sensing object by using ultrasonic waves.

The ultrasound sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the display device 100 (e.g., a call signal reception sound, a message reception sound, etc.). The audio output module 153 may include a speaker, a buzzer or the like.

The alarm unit 154 outputs a signal for informing about an occurrence of an event of the display device 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the display device 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the display device 100 may be operated in relation to a web storage device that performs the storage function of the memory 160 over the Internet.

The interface unit 170 serves as an interface with every external device connected with the display device 100. For example, the external devices may transmit data to an external device, receives and transmits power to each element of the display device 100, or transmits internal data of the display device 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the display device 100 and may include a user identity module (UIM), a subscriber identity module (SIM) a universal subscriber identity module (USIM), and the like. In addition, the device having the identification module (referred to as identifying device , hereinafter) may take the form of a smart card. Accordingly, the identifying device may be connected with the terminal 100 via the interface unit 170.

When the display device 100 is connected with an external cradle, the interface unit 170 may serve as a passage to allow power from the cradle to be supplied therethrough to the display device 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the display device 100 according to the present disclosure will be described.

Figure 2A:
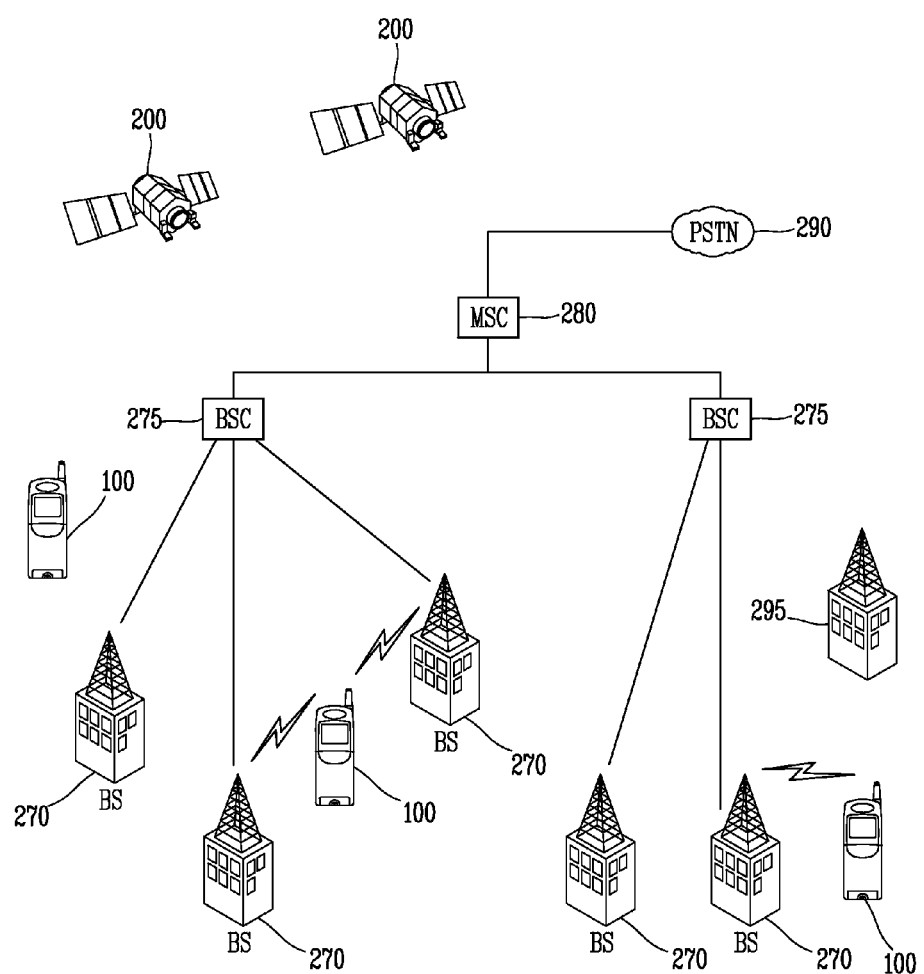
Figure 2B:
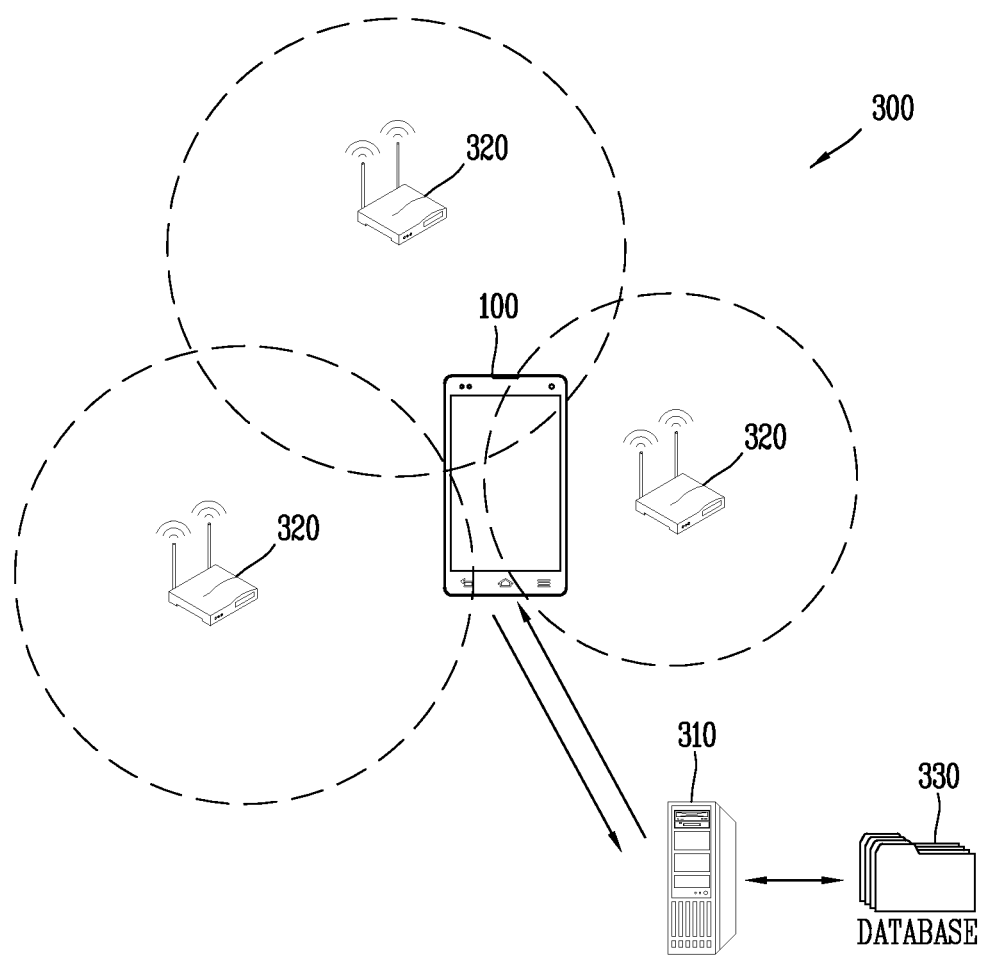

FIGS. 2A and 2B are conceptual views of a communication system operable with a display device 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the display device 100 to receive broadcast signals transmitted by the BT 295.

FIG. 2A further depicts several Global Positioning System (GPS) satellites 200. Such satellites 200 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 200 to obtain desired position information. It is to be appreciated that other types of position detection technology, (i.e., location technology that may be used in addition to or instead of GPS location technology) may alternatively be implemented. If desired, at least one of the GPS satellites 200 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the display device 100 using a WiFi module provided in the display device 100 and a wireless access point 320 for transmitting and receiving to and from the WiFi module.

The WiFi positioning system 300 may include a WiFi location determination server 310, a display device 100, a wireless access point (AP) 320 connected to the display device 100, and a database 330 stored with any wireless AP information.

The WiFi location determination server 310 extracts the information of the wireless AP 320 connected to the display device 100 based on a location information request message (or signal) of the display device 100. The information of the wireless AP 320 may be transmitted to the WiFi location determination server 310 through the display device 100 or transmitted to the WiFi location determination server 310 from the wireless AP 320.

The information of the wireless AP extracted based on the location information request message of the display device 100 may be at least one of MAC address, SSID, RSSI, channel information, privacy, network type, signal strength and noise strength.

The WiFi location determination server 310 receives the information of the wireless AP 320 connected to the display device 100 as described above, and compares the received wireless AP 320 information with information contained in the pre-established database 330 to extract (or analyze) the location information of the display device 100.

On the other hand, referring to FIG. 2B, as an example, the wireless AP connected to the display device 100 is illustrated as a first, a second, and a third wireless AP 320. However, the number of wireless APs connected to the display device 100 may be changed in various ways according to a wireless communication environment in which the display device 100 is located. When the display device 100 is connected to at least one of wireless APs, the WiFi positioning system 300 can track the location of the display device 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the display device 100 from the database 330 to extract the location information matched to the searched wireless AP, thereby extracting the location information of the display device 100.

Furthermore, the extracted location information of the display device 100 may be transmitted to the display device 100 through the WiFi location determination server 310, thereby acquiring the location information of the display device 100.

Hereinafter, a structure of the display device 100 of FIG. 1 will be explained in more detail.

Figure 3:
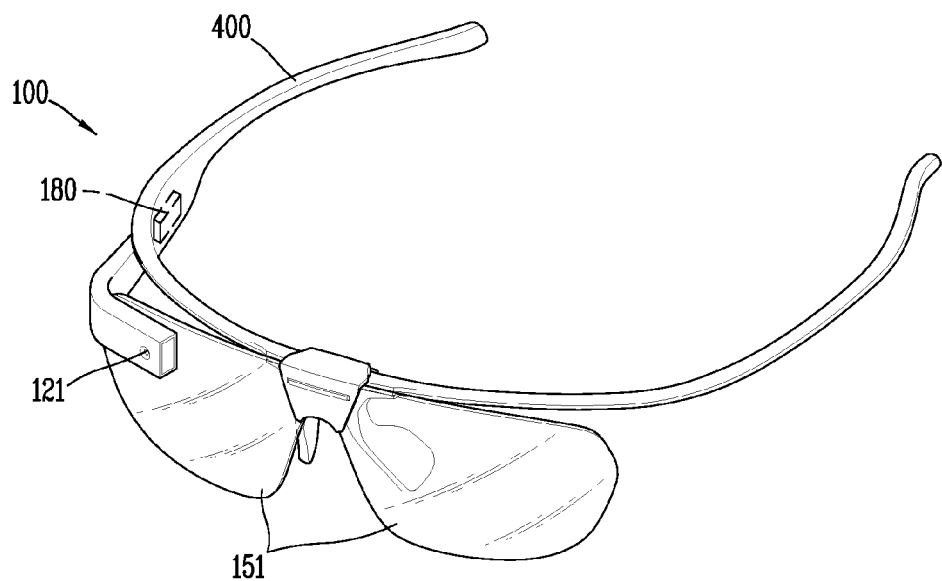

FIG. 3 is a conceptual view illustrating the display device 100 according to an embodiment of the present invention.

Referring to FIG. 3, the display device 100 according to the present invention includes a 400, a display unit 151 and a controller 180. In the specification, the display unit 151 is also referred to as "lens 151," "lenses 151," and "screen 151," and thus, all of them refer to the same component.

The display device 100 according to the present invention may be implemented as a head mounted display (HMD). More specifically, the display device 100 according to the present invention may be implemented as smart glasses.

The 400 is formed to be mountable to a wearer's head. A touch sensor for sensing a touch input is disposed at the body 310. More specifically, the 400 indicates a frame of the smart glasses 100. And the touch sensor disposed at part or an entire region of the frame may detect a touch input.

The display unit 151 may be coupled to the 400 at positions corresponding to two eyes, and may be configured to output visual information.

The visual information means a virtual object generated from the display device 100, or a virtual object input from an external device. For instance, the visual information means an application or a UI of a corresponding icon, content and call mode. The visual information may be generated under control of the controller 180, or may be received from a mobile terminal such as a smart phone.

The controller 180 may be configured to determine and execute a control command corresponding to a touch input, based on bio information including a wearer's bio-signal.

The bio-signal means an electrical signal between the human body's micro cells. The bio-signal may include a bioelectrical signal, a bioimpedance signal, an acoustic signal, a magnetic signal, a biomechanical signal, a biochemical signal, an optical signal, etc.

For instance, the bioelectrical signal means a current or voltage type signal generated by a nerve cell or a muscular cell, such as an electrocardiogram (ECG), an electromyogram (EMG), an electroencephalogram (EEG), etc. The bioimpedance signal provides information on the human body's structure, a blood amount, a blood distribution, an activity of an endocrine system, an activity of an autonomic nervous system, etc.

The bio information means information on a wearer's body, such as a bio signal, a body temperature, an eyeline (line of sight), a pupil size, and the number of times that a wearer blinks his or her eyes.

In an embodiment, the controller 180 may determine whether a wearer is in an intentional state or an unintentional state, based on the wearer's brainwaves shown on an electroencephalogram (EEG). Then, the controller 180 may execute a control command based on a touch input and the determined wearer's state.

The controller 180 may be mounted to the 400 of the display device 100, or may be integrally formed with the body 310. In another embodiment, the controller 180 may be separated from the 400.

The camera 121 may be disposed on a front surface of at least one of the display 151 for the left eye and the display 151 for the right eye. Alternatively, the camera 121 may be disposed at one side or two sides of the frame, thereby capturing even a space rather than the wearer's viewing angle.

As aforementioned, the head mounted display is implemented as smart glasses. The smart glasses implemented as a wearable device can simply execute functions of the conventional mobile terminal.

However, the smart glasses may have the following problems.

Firstly, the smart glasses have very limited input means unlike other terminals such as a smart phone and a notebook computer. Further, voice input through an input means may not be well-recognized due to external noise. Besides, a wearer's privacy cannot be protected, because a third party may hear an input voice.

Hereinafter, the display device 100 capable of enhancing a user's convenience by executing control commands corresponding to various touch inputs and user's bio information, and a method for controlling the same will be explained in more detail with reference to the attached drawings.

Figure 4:
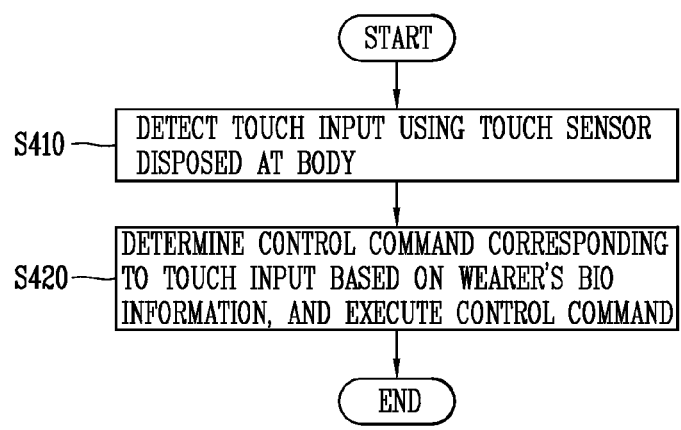

FIG. 4 is a flowchart for explaining the display device 100 (refer to FIG. 1) according to an embodiment of the present invention.

The display device 100 includes a 400, a display unit 151 and a controller 180.

Referring to FIG. 4, a touch input is sensed using a touch sensor of the 400 formed to be mountable to a wearer's head (S410).

Then, a control command corresponding to the touch input is determined to be executed, based on bio information including the wearer's bio-signal (S420).

In S420, whether the wearer is in an intentional or unintentional state may be determined based on measured bio information. More specifically, the intentional state indicates that the wearer has an intention to execute a specific control command, whereas the unintentional state indicates that the wearer does not have an intention to execute a specific control command.

For instance, the bio information includes the wearer's eyeline, a pupil size, the number of times that the wearer blinks his or her eyes, a body temperature, an electromyogram (EMG), a facial expression due to a change of facial muscles, an impedance change, etc. Such bio information may be directly measured by the display device 100, or may be received from an external measuring device.

Then, the wearer's state is determined based on the touch input and the bio information, and a corresponding control command is executed.

More specifically, even in a case where the wearer executes a touch input in an unintentional state, a specific control command may be automatically executed. For instance, if the wearer touches the frame while grimacing (frowning) the eyes unintentionally, a transparency degree of the lens 151 is controlled to block sunlight.

The wearer's intentional or unintentional state may be determined based on bio information, which is not an absolutely-required process. More specifically, the controller 180 may execute a corresponding control command based on objective bio information and touch input. The intentional state or unintentional state has been defined for convenience.

FIGS. 5A to 5D are conceptual views illustrating embodiments of touch inputs.

Figure 5A:
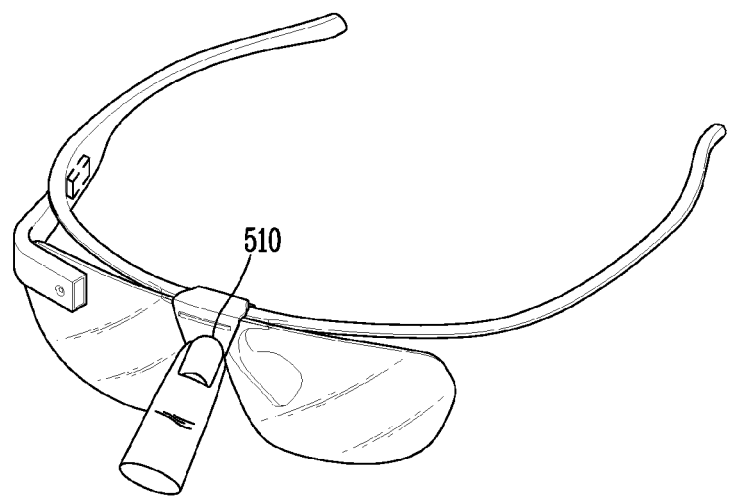

Referring to FIG. 5A, a wearer may apply a touch input to a frame 510 which connects lenses 151 for two eyes to each other. In an embodiment, the wearer may lift up the display device 100 by touching the frame 510. Alternatively, the wearer may apply a short-touch input to the frame 510 of the display device 100.

Figure 5B:
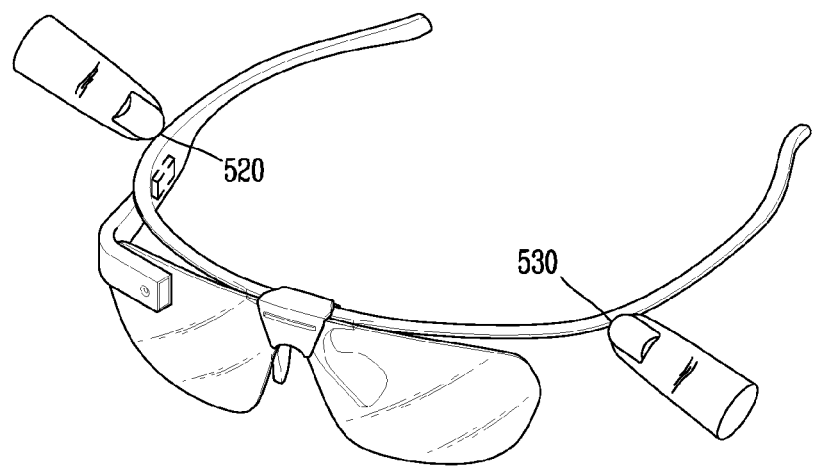

Referring to FIG. 5B, the wearer may apply a touch input to a frame 520 or 530 which connects the lens 151 to a leg portion. In an embodiment, the wearer may simultaneously touch the frames 520 and 530. Alternatively, the wearer may touch one of the frames 520 and 530.

Figure 5C:
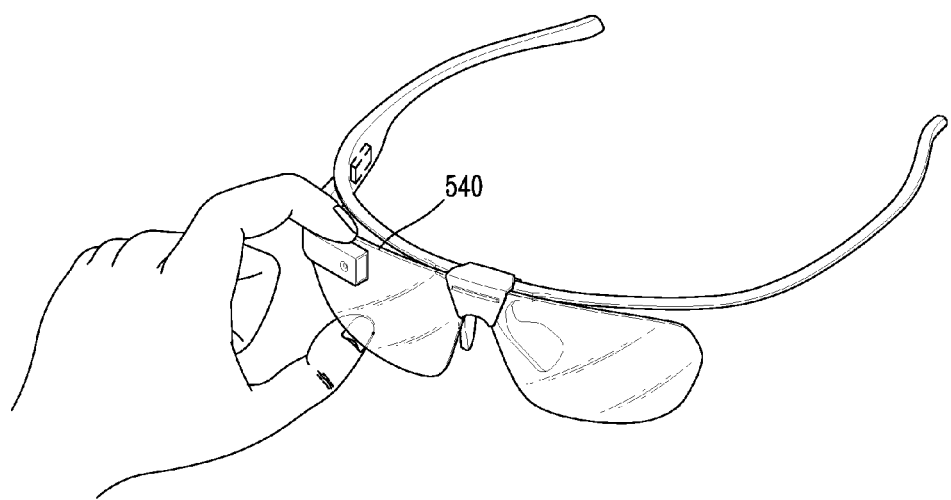

Referring to FIG. 5C, the wearer may apply a touch input to a frame 540 enclosing the lens 151. In an embodiment, the wearer may touch the frame 540 enclosing the lens 151 clockwise or counterclockwise, using one finger or two fingers.

The frame 540 enclosing the lens 151 may be defined as an edge portion of the lens 151. That is, the frame 540 may be formed of the same material as the lens 151, and a touch sensor may be disposed at the frame 540.

In another embodiment, the wearer may lift up the display device 100 by touching a lower part of the frame 540 enclosing the lens 151.

Figure 5D:
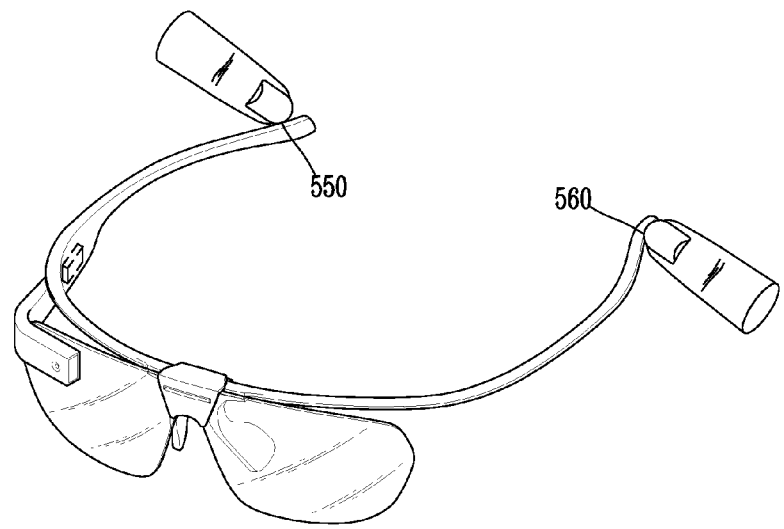

Referring to FIG. 5D, the wearer may apply a touch input to an end portion 550 of the frame 520 or an end portion 560 of the frame 530. In an embodiment, the wearer may lift up the display device 100 by simultaneously touching the end portions 550 and 560. Alternatively, the wearer may touch one of the end portion 550 and the end portion 560.

Once the touches of FIGS. 5A to 5D are sensed, a corresponding control command is determined. In this case, the aforementioned wearer's bio signal is also used.

Alternatively, a control command corresponding to a plurality of consecutive touch inputs may be determined to be executed. More specifically, when touch inputs of FIGS. 5A to 5D are consecutively executed, a corresponding control command is determined. For instance, the wearer may touch a frame which connects the lenses 151 for two eyes to each other, and then may simultaneously touch the end portions 550 and 560.

In a case where a touch input is applied to the display device 100, a control command corresponding to the touch input may be determined to be executed, based on visual information output to the display unit 151.

In this case, the wearer's intentional state may be determined based on visual information output to the display unit 151. For instance, a touch input applied to the display device 100 while a specific application is being executed may be determined as an intentional touch for executing a specific control command. On the other hand, a touch input applied to a home screen may be determined as an unintentional touch.

FIGS. 6A to 6C, 7, 8 and 9 are conceptual views illustrating an embodiment where a control command is executed by a wearer's intentional touch input.

Referring to FIG. 6A, an external image 610 viewed by a wearer, and icons 640, 650 and 660 corresponding to applications may be output to a screen 151.

The wearer may select icons 640, 650 and 660 corresponding to applications and output to the screen 151 in a touch manner. More specifically, once the wearer touches part of the frame 540, a touch icon 620 indicating an input method is output to the screen 151.

Then, the wearer may execute a touch input corresponding to the touch icon 620, thereby selecting the icons 640, 650 and 660 corresponding to applications. More specifically, the wearer may touch the frame 540 enclosing the lens 151 clockwise or counterclockwise, using two fingers.

Figure 6B:
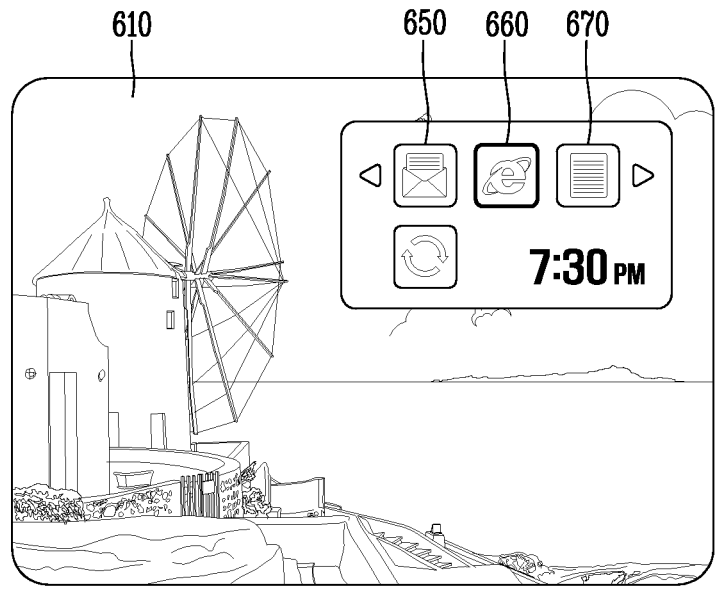

Referring to FIG. 6B, if the wearer touches the frame 540 enclosing the lens 151 in a turning manner clockwise in FIG. 6A, the icon 660 output to a right side of the current icon 650 may be selected.

As a list of the icons is turned, a new icon 670 may be output. In this case, one of a plurality of icons 660 and 670 output to a right side of the current icon 650 may be selected according to a turning degree in FIG. 6A.

Figure 6C:
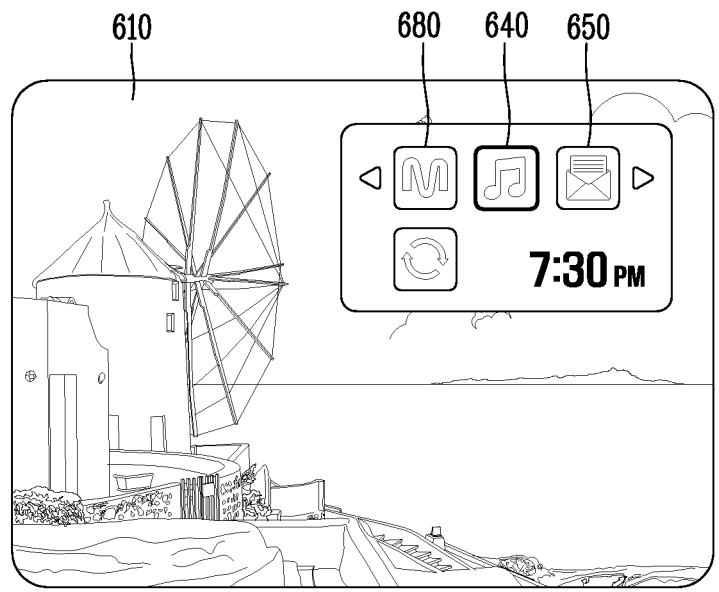
Figure 7:
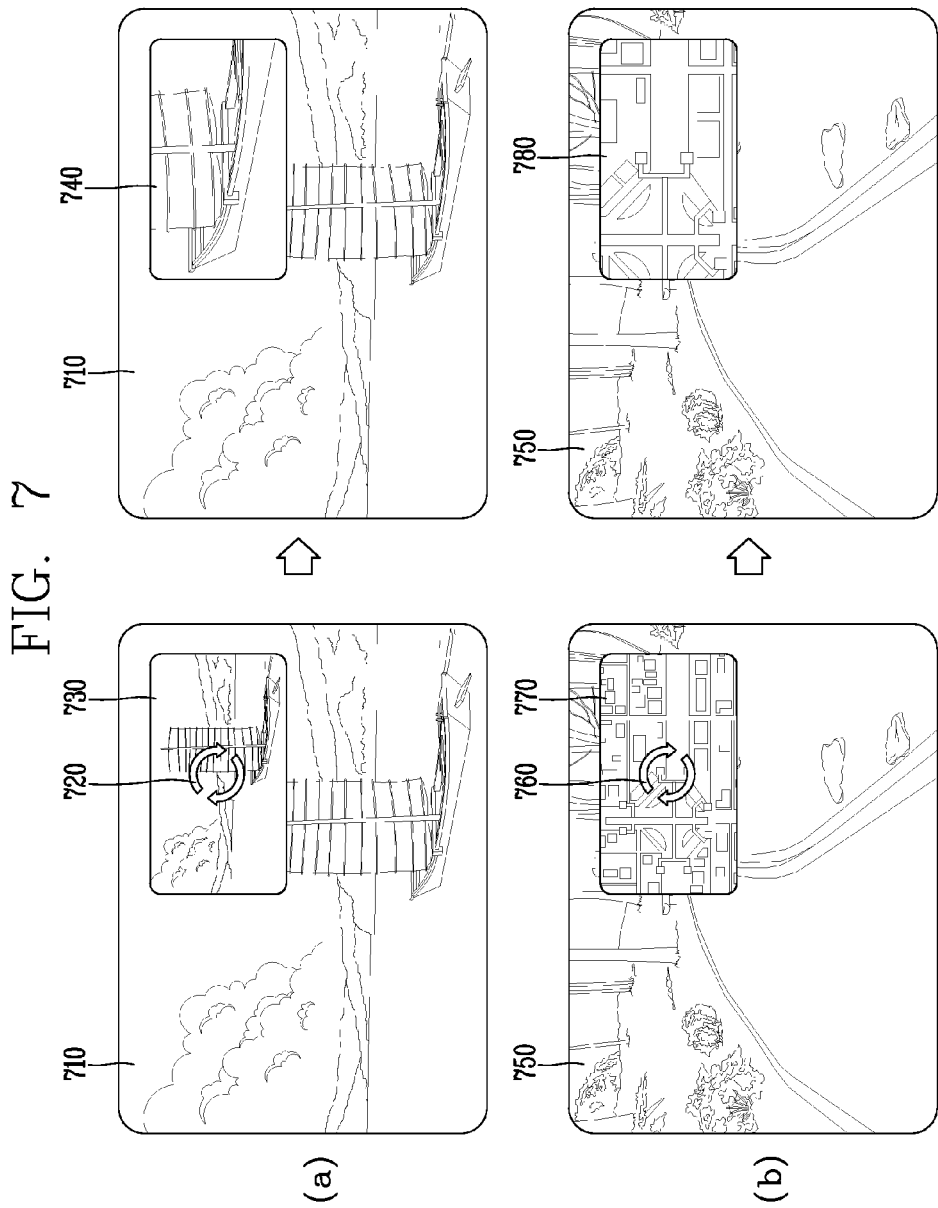
Figure 8:
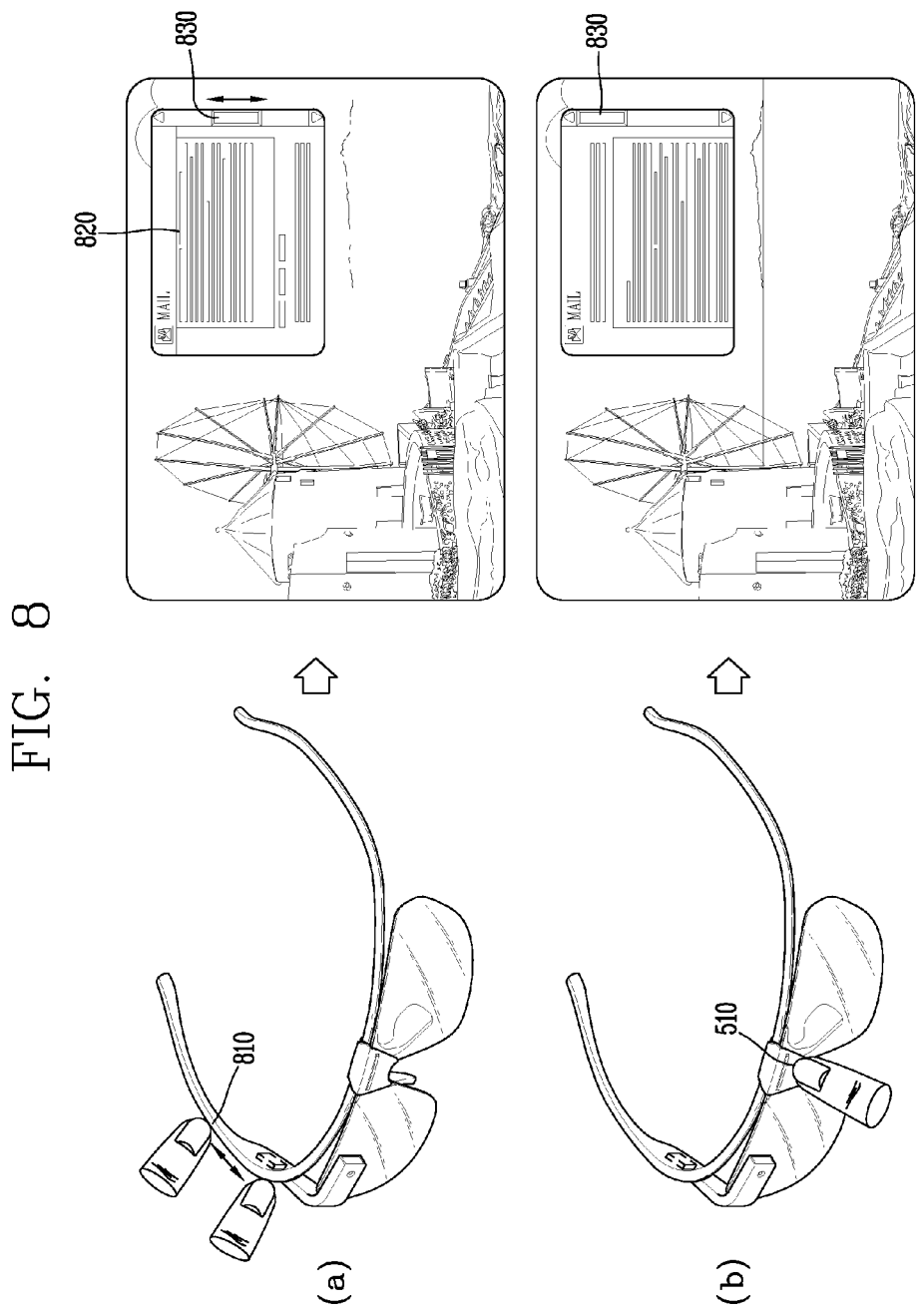
Figure 9:
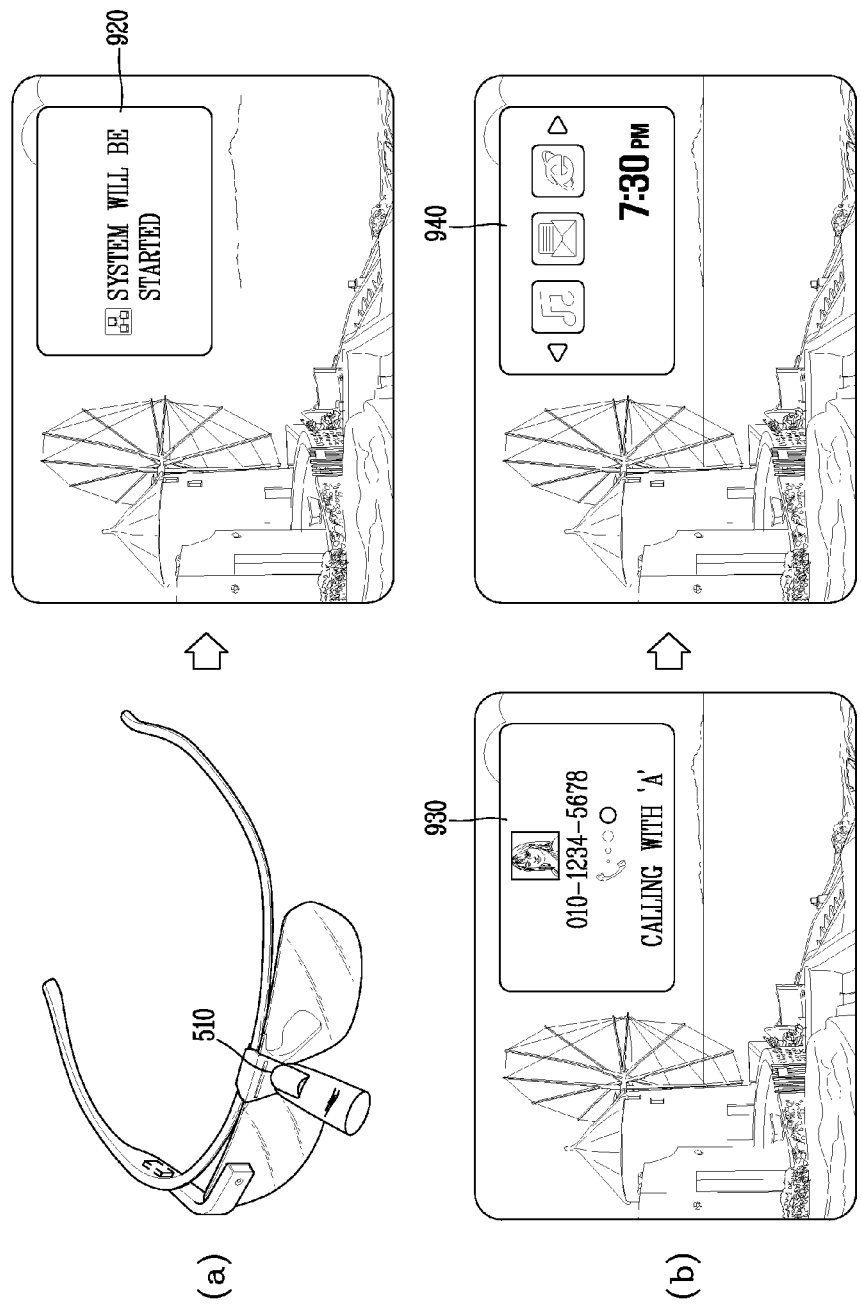

Referring to FIG. 6C, if the wearer touches the frame 540 enclosing the lens 151 in a turning manner counterclockwise in FIG. 6A, the icon 640 output to a left side of the current icon 650 may be selected.

As aforementioned, as a list of the icons is turned, a new icon 680 may be output. In this case, one of a plurality of icons 640 and 680 output to a left side of the current icon 650 may be selected according to a turning degree in FIG. 6A.

Then, the wearer may execute an application corresponding to the selected icon, by touching the screen 151 or any part on the frame 540.

Referring to FIG. 7(a), an external image 710 viewed by a wearer, and an external image 730 including a touch icon 720 indicating an input method may be output to the screen 151. In this case, the wearer may touch the frame enclosing the lens 151 in a turning manner clockwise or counterclockwise, by a touch input corresponding to the touch icon 720.

As a result, an enlarged external image 740 is output to the screen 151. In this case, a magnification of the external image 740 may be controlled according to a turning degree of the frame 540 by the wearer. For instance, if the wearer consecutively touches the frame in a turning manner or touches the frame 540 once with a large angle, a magnification of the external image 740 may be increased. As a result, a more enlarged external image may be output.

In another embodiment, an enlarged or contracted external image may be output according to the wearer's turning direction. More specifically, if the wearer turns the frame 540 clockwise, an enlarged external image may be output. On the other hand, if the wearer turns the frame 540 counterclockwise, a contracted external image may be output. Only such enlarged or contracted external image may be output to the entire region of the screen 151.

Referring to FIG. 7(b), an external image 750 viewed by a wearer, and a map image 770 including a touch icon 760 indicating an input method may be output to the screen 151. In this case, the wearer may touch the frame 540 enclosing the lens 151 in a turning manner clockwise or counterclockwise, by a touch input corresponding to the touch icon 760.

As a result, an enlarged map image 780 is output to the screen 151. In this case, a magnification of the map image 780 may be controlled according to a turning degree of the frame 540 by the wearer. For instance, if the wearer consecutively touches the frame 540 in a turning manner or touches the frame 540 once with a large angle, a magnification of the map image 780 may be increased. As a result, a more enlarged map image may be output.

Like in the aforementioned embodiment, an enlarged or contracted map image may be output according to the wearer's turning direction. More specifically, if the wearer turns the frame 540 clockwise, an enlarged map image may be output. On the other hand, if the wearer turns the frame 540 counterclockwise, a contracted map image may be output. Only such enlarged or contracted map image may be output to the entire region of the screen 151.

An image may be enlarged or contracted based on the wearer's pupil size, or the degree that the wearer blinks or grimaces the eyes. Even in a case where the wearer touches the frame 540 while grimacing (frowning) the eyes unintentionally, an image may be output in an enlarged manner.

In another embodiment, if the wearer touches the frame 540 enclosing the lens 151 in a turning manner clockwise while grimacing the eyes with viewing a distant place, an enlarged external image may be output.

Referring to FIG. 8(a), the wearer may apply a touch input back and forth along a leg 810, thereby moving a scroll bar 830 included in an image 820 of an application.

In an embodiment, if the wearer touches the display device 100 toward the lens 151 along the leg 810, the scroll bar 830 is moved upward. On the other hand, if the wearer touches the display device 100 toward an opposite side to the lens 151 along the leg 810, the scroll bar 830 is moved downward.

Referring to FIG. 8(b), the wearer may move the scroll bar 830 to an uppermost part or a lowermost part by touching the frame 510 disposed between the lenses 151 for two eyes.

In an embodiment, if the wearer adjusts the display device 100 by touching the frame 510 disposed between the lenses 151 for two eyes, the scroll bar 830 is moved to an uppermost part. If the wearer rapidly double-touches the frame 510 disposed between the lenses 151 for two eyes, the scroll bar 830 is moved to a lowermost part.

Referring to FIG. 9(a), the display device 100 has a difficulty in maintaining an ON state due to restrictions of a battery. Accordingly, a sleep mode may be maintained at ordinary times, and the sleep mode may be released when a touch input is sensed.

For instance, a sleep mode may be released by touching the frame 510 disposed between the lenses 151 for two eyes. As a result, a message window 920 indicating start of the system is output.

Referring to FIG. 9(b), a touch input may be applied to the display device 100 while a specific application is being executed or after a specific application has been executed, thereby converting the current screen into a home menu screen 940.

In an embodiment, the frame 510 disposed between the lenses 151 for two eyes may be touched while a call application 930 is being executed or after the call application 930 has been executed, thereby outputting the home menu screen 940.

As aforementioned, the wearer's intentional state can be determined based on the wearer's bio information, an application being executed, etc. For instance, a touch input, applied to the display device 100 in a home screen state or in a state where a specific function is not being performed, may be determined as a touch input in an unintentional state.

Figure 10:
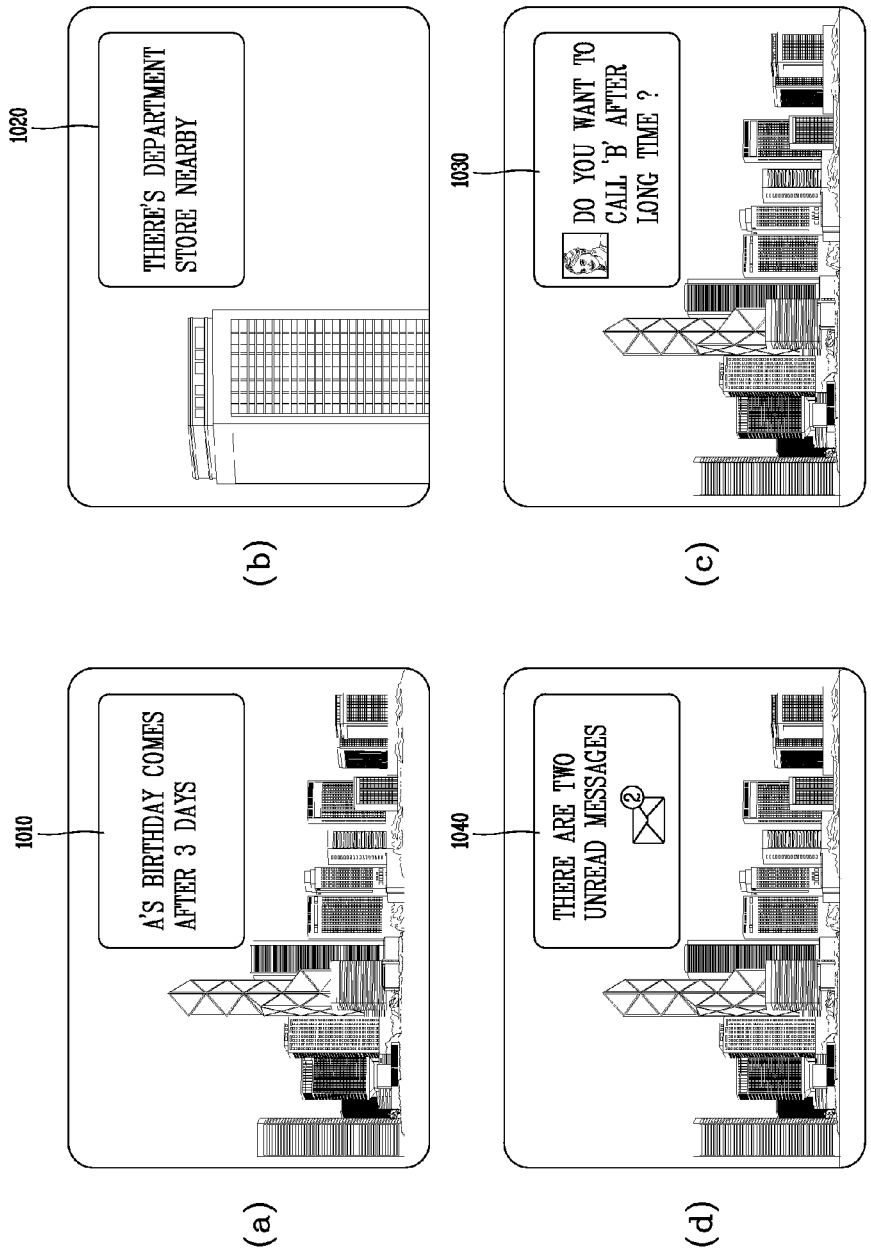
Figure 11:
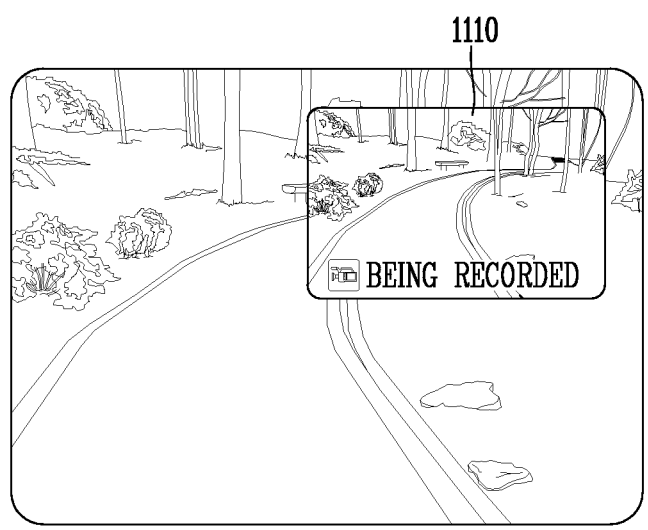

FIGS. 10 and 11 are conceptual views illustrating an embodiment where a control command is executed by a wearer's unintentional touch input.

Referring to FIG. 10(a), if a touch input is applied to the display device 100 after a wearer's closing hour (quitting time), information recorded in a prescribed application may be checked and then a schedule may be notified to the wearer.

In an embodiment, the wearer may lift up the display device 100 by touching a lower part of the frame enclosing the lens 151 after quitting time. As a result, a birthday message window 1010 recorded in a prescribed application is output.

In case of FIG. 10(a), a list of birthday presents recorded in a prescribed application or on a memo pad may be checked. If the wearer passes by, using a GPS, a mart or a department store where the wearer can purchase the presents, a message window 1020 indicating the mart or department store may be output as shown in FIG. 10(b).

Referring to FIG. 10(c), if a touch input is applied to the display device 100 after the wearer's quitting time, counterparts with whom the wearer has frequently talked over the telephone may be searched from the previous call history. Then, a message window 1030, which recommends a call to a counterpart with whom the wearer has not frequently talked, may be output.

Referring to FIG. 10(d), a message window 1040 indicating an unchecked text message, a messenger message, a missed call, an SNS, an e-mail, etc. may be output by a touch input.

In another embodiment, an external image output to the display unit 151 may be recorded using a control command corresponding to a touch input.

Referring to FIG. 11, once the wearer applies a touch input to the display device 100, an external image viewed by the wearer for a prescribed time may be recorded.

In an embodiment, if the wearer adjusts the display device 100 by touching any part of the display device 100 unintentionally, an external image input to the lens 151 may be recorded for a preset time (1110). In this case, if the wearer's head moves rapidly using a gyro or an accelerometer of the display device 100, the recording may be stopped. As a result, a daily life viewed by the wearer may be recorded as a moving image to thus be stored.

A control command corresponding to a plurality of touch inputs applied to the display device 100 in such an unintentional state may be set. In an embodiment, as the number of a plurality of touch inputs is increased, a control command having a lower importance may be executed. Further, as a touch input becomes simpler, a control command having a higher importance may be executed.

In still another embodiment, the wearer's feeling (emotion) state may be determined based on the wearer's bio information, and a control command corresponding to the feeling state may be executed. More specifically, the wearer's angry state may be determined based on the wearer's body temperature and a change of facial muscles. If a touch input is applied to the display device 100 under such state, tranquil or quiet music or image may be output.

The present invention can have the following advantages.

Firstly, as a control command corresponding to various touch inputs and a wearer's bio information can be executed, a problem that an input means of the display device is limited can be solved. Secondly, a control command corresponding to even a wearer unintentional touch input can be set to be executed. This can enhance a user's convenience.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet). The computer may include the controller of the mobile terminal.

The invention claimed is:

1. A display device, comprising:
   a body formed to be mountable to a wearer's head, and having a touch sensor for sensing a touch input;
   a display unit coupled to the body at positions corresponding to two eyes, and configured to output visual information; and
   a controller configured to:
      obtain bio information about the wearer, wherein the bio information is measured by the display device or received from an external device;
      determine whether the sensed touch input is an intentional input or an unintentional input based on the bio information; and
      execute a control command corresponding to the touch input based on current time, a position of the wearer, and usage history of the wearer, wherein a different control command is executed based on whether the touch input is the intentional input or the unintentional input, the current time, the position of the wearer, and the usage history of the wearer.

2. The display device of claim 1, wherein the controller is further configured to execute the control command corresponding to the touch input based on the visual information output to the display unit.

3. The display device of claim 1, wherein the controller is further configured to execute the control command corresponding to a plurality of consecutive touch inputs.

4. The display device of claim 1, wherein the controller is further configured to release a sleep mode when the control command corresponding to the touch input is executed.

5. The display device of claim 1, wherein the controller is further configured to record an external image viewed by the wearer when the control command corresponding to the touch input is executed.

6. A method for controlling a display device, the method comprising:
- sensing a touch input using a touch sensor of a body formed to be mountable to a wearer's head, wherein the body is coupled to a display unit disposed at positions corresponding to two eyes;
- obtaining bio information about the wearer, wherein the bio information is measured by the display device or received from an external device;
- determining whether the sensed touch input is an intentional input or an unintentional input based on the bio information; and
- executing a control command corresponding to the touch input based on current time, a position of the wearer, and usage history of the wearer, wherein a different control command is executed based on whether the touch input is the intentional input or the unintentional input, the current time, the position of the wearer, and the usage history of the wearer.

7. The method of claim 6, wherein executing the control command includes executing the control command corresponding to the touch input based on visual information output to the display unit.

8. The method of claim 6, wherein executing the control command includes executing the control command corresponding to a plurality of consecutive touch inputs.

9. The method of claim 6, wherein executing the control command includes releasing a sleep mode when the control command corresponding to the touch input is executed.

10. The method of claim 6, wherein executing the control command includes recording an external image viewed by the wearer when the control command corresponding to the touch input is executed.

11. The display device of claim 1, wherein the bio information comprises a bio signal, a body temperature, an eyeline or line of sight, a pupil size, and a number of times that the wearer blinks eyes.

12. The display device of claim 11, wherein the bio information further comprises an electromyogram (EMG), a facial expression due to a change of facial muscles, and an impedance change.

13. The display device of claim 1, wherein the controller is further configured to determine whether the touch input is the intentional input or the unintentional input based on the wearer's brainwaves shown on an electroencephalogram (EEG).

14. The display device of claim 1, wherein:
- the intentional input indicates that the wearer has an intention to execute a specific control command; and
- the unintentional input indicates that the wearer does not have an intention to execute a specific control command.

15. The display device of claim 1, wherein:
- the display unit is in a form of a lens; and
- the controller is further configured to control a transparency degree of the lens to block sunlight in response to the bio information comprising grimacing or frowning of eyes.

* * * * *